United States Patent [19]

Lenaerts

[11] Patent Number: 5,001,743
[45] Date of Patent: Mar. 19, 1991

[54] METHOD AND APPARATUS FOR CONTROLLING A TELEPHONE ANSWERING DEVICE

[75] Inventor: George V. Lenaerts, London, Canada

[73] Assignee: Northern Telecom Limited, Montreal, Canada

[21] Appl. No.: 463,051

[22] Filed: Jan. 10, 1990

[51] Int. Cl.⁵ .................. H04M 1/65; H04M 1/72
[52] U.S. Cl. ............................. 379/67; 379/82; 379/387
[58] Field of Search ............ 379/88, 67, 79, 82, 379/160, 387, 377

[56] References Cited

U.S. PATENT DOCUMENTS

| | | | |
|---|---|---|---|
| 4,577,067 | 3/1986 | Levy et al. | 379/88 X |
| 4,578,540 | 3/1986 | Borg et al. | 379/40 |
| 4,769,837 | 9/1988 | McCormick et al. | 379/393 |
| 4,833,073 | 5/1989 | Suzuki | 379/67 |
| 4,860,339 | 8/1989 | D'Agosto, III et al. | 379/67 |
| 4,881,259 | 11/1989 | Scordato | 379/58 |
| 4,941,166 | 7/1990 | Waldman et al. | 379/67 |

*Primary Examiner*—Thomas W. Brown
*Attorney, Agent, or Firm*—John E. Mowle

[57] ABSTRACT

A control circuit for a telephone answering device provides the capability of disconnecting the telephone answering device from a telephone line and powering a microphone contained within a telephone handset connected to the telephone answering device. Recording of outgoing messages can then be done through the telephone set thus reducing background and tape noise. The control circuit also provides the capability of disabling the functions of the telephone answering device when any telephone set, connected to the same telephone line as the telephone answering device, is taken off-hook.

10 Claims, 1 Drawing Sheet

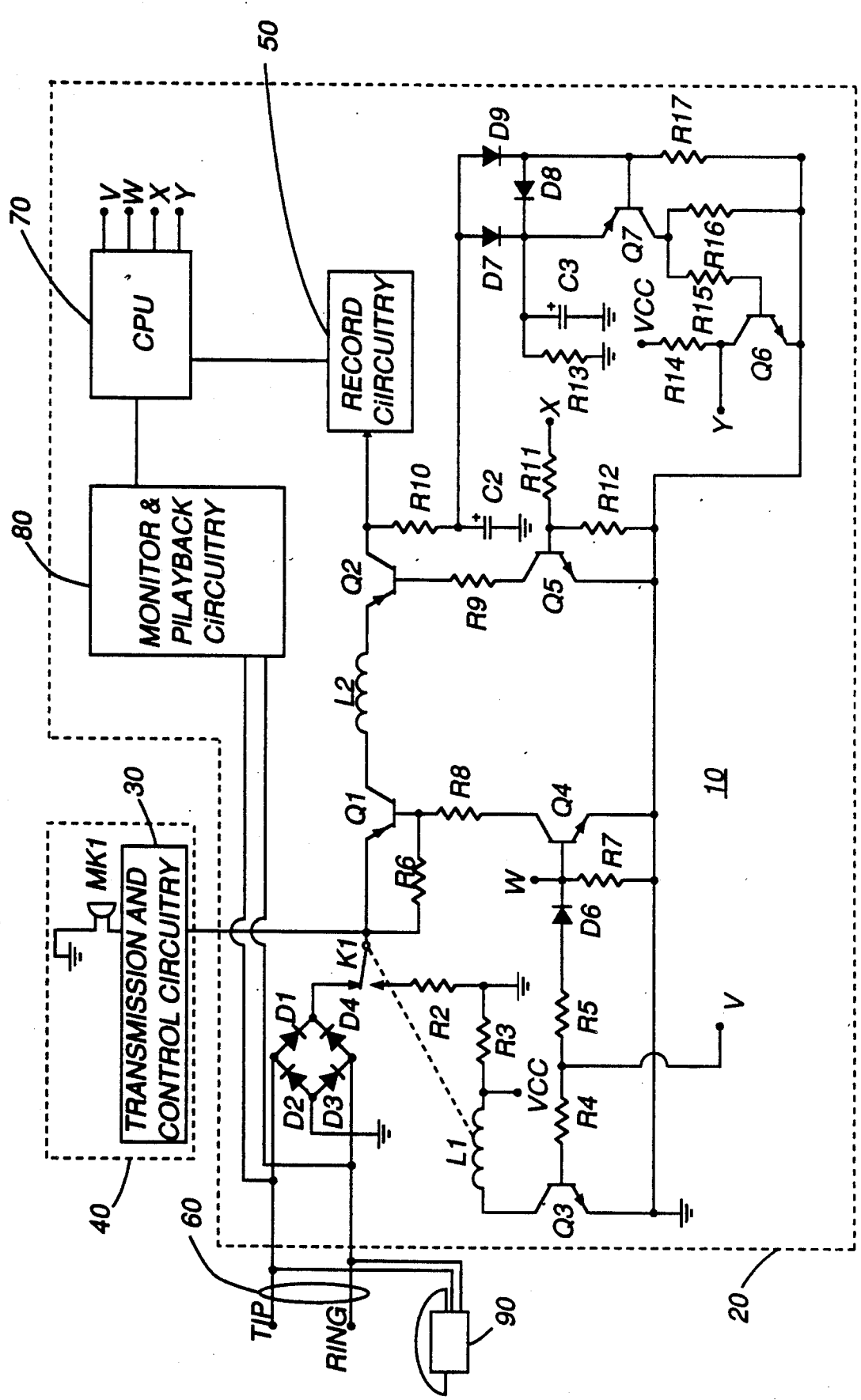

METHOD AND APPARATUS FOR CONTROLLING A TELEPHONE ANSWERING DEVICE

FIELD OF THE INVENTION

The present invention relates generally to telephone answering devices. In particular, the present invention relates to a control circuit for a telephone answering device.

BACKGROUND OF THE INVENTION

It has been customary, to date, to consider a telephone answering device as basically a tape recorder attached to a telephone. In general, recording of outgoing messages (OGM) on a telephone answering device (TAD) has been done through a microphone installed in the base of the TAD. One problem with this is that it can be difficult to get close enough to the microphone in order to input a message, especially if the TAD is in a wall mounted position Furthermore, due to the omnidirectional nature of such a microphone, and the greater distance of the user from the microphone, a great deal of background noise is recorded making it difficult for a listener to understand a recorded message. Another problem that arises is the amount of tape noise recorded due to the proximity of the tape drive to the microphone.

A further problem with prior art TADs has been that only the telephone attached to the TAD will cause the TAD to stop playing or recording a message once the handset of the telephone has been picked up. A person who picks up an extension telephone in another room is incapable of disabling the TAD and consequently must wait for the TAD to complete its processes before starting a conversation with the caller.

SUMMARY OF THE INVENTION

The present invention integrates the TAD with the telephone, thus allowing messages to be recorded directly through the handset microphone of the telephone. By doing so tape noise is eliminated. Furthermore, as the user is closer to the mouthpiece of the handset a greater sound pressure is realized at the microphone thus improving the signal-to-noise ratio significantly, thereby greatly reducing any background noise recorded. Moreover, with the present invention a user feels more comfortable and less intimidated while recording messages.

The present invention also allows a user to pick up any telephone connected to the same line as the telephone answering device, and in doing so disable the functions of the TAD, thus providing remote control of the TAD.

Stated in other terms, the present invention is a control circuit for a telephone answering device, the control circuit controlling electrical connections between the telephone answering device, a telephone line, and a telephone set electrically connected to the telephone line, wherein the telephone set is provided for conducting telephone conversations on the telephone line and for recording messages on the telephone answering device, the control circuit comprising:

auxiliary power means for powering the telephone set when the telephone set is electrically disconnected from the telephone line;

first switch means for selectively disconnecting the telephone line from the telephone set, and circuitry within the control circuit, and connecting the telephone set to the auxiliary power means; and second switch means for actuating the first switch means;

said first and second switch means responsive to a control signal from the telephone answering device, the control signal actuating the second switch means which thereby actuates the first switch means to disconnect the telephone line from the telephone set, and the circuitry within the control circuit, and to connect the auxiliary power means to the telephone set, whereby speech signals from the telephone set are provided to the telephone answering device for recording.

Stated in yet other terms, the invention is a control circuit for a telephone answering device which is electrically connected to a telephone line having at least one telephone set electrically connected thereto the telephone line providing power for the telephone set, the control circuit comprising:

first and second storage means for storing an electrical charge resulting from the power appearing on the telephone line;

first and second discharge means for discharging the first and second storage means, respectively, at different rates to create a transitory voltage differential between the first and second storage means, the transitory voltage differential occurring whenever the at least one telephone set goes to an off-hook state, thereby producing a voltage drop on the telephone line; and, control means, activated by the voltage differential between the first and second storage means, for cancelling operations of the telephone answering device and placing the telephone answering device in an on-hook mode.

Stated in still other terms, the invention is a method of disabling a telephone answering device, the method comprising the steps of:

detecting the transition of a telephone set from an on-hook state to an off-hook state, the telephone set being connected to a telephone line to which the telephone answering device is also connected; and, generating a signal in response to the detection of the transition which thereby cancels any operations of the telephone answering device and places the telephone answering device in an on-hook mode.

Stated again in other terms, the invention is a method of controlling a telephone answering device, the method comprising the steps of:

selectively disconnecting a telephone set, electrically connected through the telephone answering device to a telephone line, from the telephone line;

powering the telephone set when the telephone set is disconnected from the telephone line;

connecting a microphone contained in a handset of the telephone set, to recording circuitry within the telephone answering device when the telephone set is disconnected from the telephone line, thereby allowing speech information impinging on the microphone to be recorded by the telephone answering device;

detecting the transition of at least one other telephone set, connected to the telephone line, from an on-hook state to an off-hook state; and, generating a signal in response to the detection of the transition which thereby cancels any operations of the telephone answering device and places the telephone answering device in an on-hook mode.

BRIEF DESCRIPTION OF THE DRAWINGS

The invention will be readily understood by the following description of a preferred embodiment, by way of example, in conjunction with the accompanying schematic drawing of a control circuit according to the present invention.

DETAILED DESCRIPTION OF THE INVENTION

The attached figure illustrates a control circuit 10 within a telephone answering device (TAD) 20 which is capable of both providing access to a microphone MK1 in a telephone set 40 (connected to the TAD 20) for recording of messages on the TAD 20, and for disabling the functions of the TAD 20 when any telephone, connected to the same telephone line 60 as the TAD 20, is taken off-hook.

When it is desired to record an outgoing message (OGM), the telephone answering device 20 is placed in a recording mode so as to record any signals onto a resident storage device (not shown) via the record circuitry 50. In activating the recording mode, a central processing unit (CPU) 70, internal to the TAD 20, forces lead V to go to a state of high potential, thus causing transistor Q3 to turn on (via resistor R4). This in turn powers relay coil L1, thereby actuating its contacts K1 to disconnect from the diode bridge (D1, D2, D3, D4) consequently isolating the telephone line signals appearing on the leads TIP and RING from the telephone set 40. The disconnection of the telephone set 40 from the diode bridge (D1, D2, D3, D4) further leads to power from the telephone line 60 (generated at the telephone company's central office) to be disconnected from the telephone set 40, and thus no power is supplied to a telephone transmission and control circuit 30 in the telephone set 40. However, when the relay K1 is switched from the diode bridge (D1, D2, D3, D4) it connects a current path which flows from $V_{CC}$ through the resistors R2 and R3 and through the contacts of the relay K1 to the telephone transmission and control circuit 30. With auxiliary voltage thus applied the telephone transmission and control circuit 30 resumes functioning, allowing the microphone MK1 to be used to transmit signals to the TAD 20 for recording.

The signal to be recorded must pass through transistor Q1 which is controlled via power supplied to the base of transistor Q1 from transistor Q4. Transistor Q4 is controlled by either a signal appearing on lead V, via resistor R5 and diode D6, or by a signal appearing on lead W, and is biased by resistor R7. If either of lead V or lead W is in a state of high potential, Q4 will be turned on, thus supplying power to the base of transistor Q1. The signal appearing on lead W is generated by the CPU 70 and is representative of the TAD 20 going to an on-line state to record incoming messages on the telephone line 60. Resistors R6 and R8 provide biasing for transistor Q1.

All incoming signals to be recorded pass through the inductor L2 to the transistor Q2. Transistor Q2 is controlled via transistor Q5 which in turn is controlled by a signal X generated by the CPU 70. Resistors R9, R11, and R12 provide biasing for the transistors Q2 and Q5. The signal X is used to indicate when recording is in operation. Thus when signal X is of high potential, transistor Q5 conducts and consequently places transistor Q2 in a state of conduction.

After the recording has been completed, the TAD 20 is taken out of its record mode. Consequently the CPU 70 forces lead V to a low potential, thus causing contacts K1 to reconnect back to TIP and RING. The auxiliary power is disconnected at the same time, and power to the telephone handset 40 is once again obtained from the telephone line 60. At this point, any incoming signals from the telephone line 60 will be monitored by the TAD 20.

In normal operation, if the TAD 20 is in a mode to monitor the telephone line 60, any calls received will be processed by the TAD 20. The TAD 20 monitors the telephone line 60 through the monitor and playback circuitry 80 internal to the TAD 20. During monitoring of the telephone line 60, an indication of any ringer signals detected by the circuitry 80 is provided to the CPU 70. Upon reception of a ringer signal, the CPU 70 instructs the circuitry 80 to answer the incoming telephone call by setting the telephone line 60 in an off-hook state. This is performed by the circuitry 80 which places a resistive load therein (not shown) on the telephone line 60, thus causing the voltage on the telephone line 60 (supplied from the telephone company's central office at a level of approximately 48 V) to drop to approximately 6 V due to the resistance of the telephone line 60. The CPU 70 then causes the pre-recorded OGM message to be played via the circuitry 80 and subsequently places the TAD 20 in a mode to record any incoming message (ICM) onto a resident storage device (not shown) via the record circuitry 50.

While the telephone call is being processed by the TAD 20, the TAD 20 further monitors for a subsequent drop in voltage on the telephone line 60 which would indicate that the telephone set 40 or another telephone 90, connected to the same telephone line 60 as the TAD 20, has gone off-hook. The subsequent voltage drop is a result of second loading on the telephone line 60 caused by the telephone 90 of set 40 being placed in parallel with the TAD 20. If a telephone going off-hook is detected, the CPU 70 cancels any current operations and places the TAD 20 in a stand-by mode. This function is further explained in the following paragraphs.

When the TAD 20 is triggered by ringer signals appearing on the leads TIP and RING the CPU 70 will place the TAD 20 on-line (i.e. place the telephone line 60 in an off-hook condition) to answer the call. This causes the voltage on telephone line 60 to drop to approximately 6 volts. At this moment the collector voltage of transistor Q2 is approximately 6 volts (as transistor Q1 has been placed in an on state via the control signal on lead W, turning on transistor Q4 and consequently transistor Q1), and consequently capacitors C2 and C3 are charged to approximately 6 volts. Transistor Q7 is now turned off since the emitter-base voltage of Q7 is 0 volts. This leads to zero voltage in the base of transistor Q6, thus turning transistor Q6 off. As a result, the collector voltage of transistor Q6 is approximately at a nominal voltage $V_{CC}$ of 5.4 volts. The collector of transistor Q6 is connected to the CPU 70 via lead Y which is used to activate a Calling Party Controller (CPC) function of the TAD 20 which is capable of cancelling the current call processing. Thus, when lead Y goes from high to low, the CPU 70 will detect the falling edge and activate the CPC function to thereby stop the operation of the machine.

When the CPC function is activated the TAD 20 will stop all operations (this includes outgoing message (OGM) playing from the circuitry 80, incoming message (ICM) recording via the record circuitry 50, fast forward (FF) processing, or rewind (REW) processing) and go on-hook (which disconnects the resistive load in the circuitry 80).

When any one of the telephones (such as shown by telephones 40 or 90) picked the voltage on telephone line 60 will drop from the present 6 volts to approximately 4 volts, due to the increased loading on the line by the telephone 40 or 90 and the TAD 20 being placed in parallel across the telephone line 60. This causes capacitors C2 and C3 to discharge. The RC time constants of capacitor C2 and resistor R10, as well as capacitor C3 and resistor R13, cause the capacitors C2 and C3 to discharge at different rates. In particular, the capacitor C2 discharges at a faster rate than the capacitor C3, the time constants typically being 30 milliseconds and 100 seconds respectively. This causes a voltage difference between the base and the emitter of transistor Q7. When the voltage at the emitter-base of Q7 reaches 0.6 volts, the transistor Q7 is turned on, which consequently leads to transistor Q6 turning on. At this time the collector of transistor Q6 will go low from high, thereby activating the CPC function. It is to be noted that diodes D7, D8, and D9 provide isolation between the resistor/capacitor pairs R10/C2 and R13/C3.

When capacitors C2 and C3 have discharged, the emitter-base voltage of the transistor Q7 is once again 0 volts. This turns transistor Q7 off, which in turn causes transistor Q6 to turn off. Transistor Q6 turning off causes lead Y to return to a state of high potential, consequently deactivating the CPC function of the TAD 20. At this point the TAD 20 is returned to a state in which it may monitor for any new incoming telephone calls. It is to be noted that biasing for transistors Q6 and Q7 are provided by resistors R14, R15, R16, and R17.

What is claimed is:

1. A control circuit for a telephone answering device, the control circuit controlling electrical connections between the telephone answering device, a telephone line, and a telephone set electrically connected to the telephone line, wherein the telephone set is provided for conducting telephone conversations on the telephone line and for recording messages on the telephone answering device, the control circuit comprising:
    auxiliary power means for powering the telephone set when the telephone set is electrically disconnected from the telephone line;
    first switch means for selectively disconnecting the telephone line from the telephone set, and circuitry within the control circuit, and connecting the telephone set to the auxiliary power means; and
    second switch means for actuating the first switch means;
    said first and second switch means responsive to a control signal from the telephone answering device, the control signal actuating the second switch means which thereby actuates the first switch means to disconnect the telephone line from the telephone set, and the circuitry within the control circuit, and to connect the auxiliary power means to the telephone set, whereby speech signals from the telephone set are provided to the telephone answering device for recording.

2. A control circuit for a telephone answering device as claimed in claim 1 further comprising:
    first and second storage means for storing an electrical charge appearing on the telephone line;
    first and second discharge means for discharging the first and second storage means, respectively, at different rates to create a transitory voltage differential between the first and second storage means, the transitory voltage differential occurring whenever the at least one telephone set goes to an off-hook state, thereby producing a voltage drop on the telephone line; and,
    control means, activated by the voltage differential between the first and second storage means, for cancelling operations of the telephone answering device and placing the telephone answering device in an on-hook mode.

3. A control circuit as claimed in claim 1 wherein the first switch means is a relay and the second switch means is a transistor.

4. A control circuit as claimed in claim 2 wherein the first switch means is a relay and the second switch means is a transistor.

5. A control circuit as claimed in claim 2 wherein the control means comprises a transistor, the first and second discharge means are resistor capacitor networks, and the first and second storage means are capacitors.

6. A control circuit for a telephone answering device which is electrically connected to a telephone line having at least one telephone set electrically connected thereto, the telephone line providing power for the telephone set, the control circuit comprising:
    first and second storage means for storing an electrical charge resulting from the power appearing on the telephone line;
    first and second discharge means for discharging the first and second storage means, respectively, at different rates to create a transitory voltage differential between the first and second storage means, the transitory voltage differential occurring whenever the at least one telephone set goes to an off-hook state, thereby producing a voltage drop on the telephone line; and,
    control means, activated by the voltage differential between the first and second storage means, for cancelling operations of the telephone answering device and placing the telephone answering device in an on-hook mode.

7. A control circuit as claimed in claim 6 wherein the control means comprises a transistor, the first and second discharge means are resistor capacitor networks, and the first and second storage means are capacitors.

8. A method of controlling a telephone answering device, the method comprising the step of:
    selectively disconnecting a telephone set, electrically connected through the telephone answering device to a telephone line, from the telephone line;
    powering the telephone set when the telephone set is disconnected from the telephone line;
    connecting a microphone contained in a handset of the telephone set, to recording circuitry within the telephone answering device when the telephone set is disconnected from the telephone line, thereby allowing speech information impinging on the microphone to be recorded by the telephone answering device;
    detecting the transition of at least one other telephone set, connected to the telephone line, from an on-hook state to an off-hook state; and,
    generating a signal in response to the detection of the transition which thereby cancels any operations of the telephone answering device and places the telephone answering device in an on-hook mode.

9. A method of controlling a telephone answering device as claimed in claim 8 wherein the detecting step is performed by discharging a pair of storage devices at different rates in response to the telephone set going to an off-hook condition; comparing the voltages in the pair of storage devices; and generating the signal in response to the comparison to selectively cancel any operations of the telephone answering device and place the telephone answering device in an on-hook mode.

10. A method of disabling a telephone answering device, the method comprising the steps of:

detecting the transition of a telephone set from an on-hook state to an off-hook state, the telephone set being connected to a telephone line to which the telephone answering device is also connected; and, generating a signal in response to the detection of the transition which thereby cancels any operations of the telephone answering device and places the telephone answering device in an on-hook mode; wherein the detecting step is performed by discharging a pair of storage devices at different rates in response to the telephone set going to an off-hook condition; comparing the voltages in the pair of storage devices; and generating the signal in response to the comparison to selectively cancel any operations of the telephone answering device and place the telephone answering device in an on-hook mode.

* * * * *